United States Patent [19]

Amberg

[11] 4,180,223

[45] Dec. 25, 1979

[54] LIMITED-SLIP BRAKE CONTROL SYSTEM

[75] Inventor: Robert L. Amberg, Seattle, Wash.

[73] Assignee: The Boeing Company, Seattle, Wash.

[21] Appl. No.: 865,181

[22] Filed: Dec. 28, 1977

[51] Int. Cl.$^2$ ............................................. B64C 25/46
[52] U.S. Cl. ..................................... 244/111; 303/93;
303/106; 303/107
[58] Field of Search ....................... 303/93, 94, 95, 97,
303/104, 105, 106, 107, 110, 111, 20; 244/111;
361/238, 242; 364/426

[56] References Cited

U.S. PATENT DOCUMENTS

| | | | |
|---|---|---|---|
| 3,275,384 | 9/1966 | Hirzel | 303/111 |
| 3,850,480 | 11/1974 | Atkins | 303/106 |
| 3,917,356 | 11/1975 | DeVlieg | 303/93 |
| 3,985,398 | 10/1976 | Straub | 244/111 |
| 4,078,845 | 3/1978 | Amberg | 303/107 |

Primary Examiner—Reinhard J. Eisenzopf
Attorney, Agent, or Firm—Christensen, O'Connor, Johnson & Kindness

[57] ABSTRACT

A limited-slip brake control system includes a basic deceleration control circuit responsive to a wheel deceleration signal and to a selected reference deceleration signal to provide a first brake control signal which is used to modulate brake pressure applied to a braked wheel of a vehicle in order to maintain the vehicle deceleration at a selected reference deceleration representing a level of brake force generally lying in the nonslip portion of a characteristic Mu/slip curve for the vehicle. A large deviation control circuit is also responsive to the wheel deceleration signal and functions to modify the first brake control signal to cause brake pressure to be reduced when the wheel deceleration exceeds a second reference deceleration representing a level of brake force generally lying in a slip portion of the characteristic Mu/slip curve, or, corresponding to a situation where the braked wheel encounters a sudden decrease in the available coefficient of friction and is forced into a skid by the basic deceleration control circuit. A second brake control signal is also provided by the large deviation control circuit when the actual wheel deceleration exceeds a third reference deceleration, higher than the second reference deceleration, signifying that the braked wheel has gone into a deep skid, which second brake control signal is used to immediately reduce brake pressure. An initial skid circuit functions to modify the first brake control signal to minimize or eliminate the tendency of the basic deceleration control circuit to place the braked wheel into a skid upon the initial application of brake pressure, and a dynamic compensation circuit is responsive to the wheel deceleration signal to provide a compensating brake control signal which is combined with the first brake control signal in order to compensate the brake pressure command represented by the first brake control signal for apparent changes in wheel deceleration occasioned by landing gear strut assembly oscillation.

26 Claims, 5 Drawing Figures

$\ddot{X}_A$ = AIRPLANE DECELERATION
$F(\ddot{X}_A)$ = A FUNCTION OF AIRPLANE DECELERATION

LIMITED-SLIP BRAKE CONTROL SYSTEM

FIELD OF THE INVENTION

This invention generally relates to brake control systems for vehicles and, more particularly, to improvements in limited-slip brake control systems, that is, those brake control systems which seek to limit the brake force developed by to a braked vehicular wheel so that the brake force remains on the positive slope side of a characteristic brake force-percent slip curve for the vehicle.

BACKGROUND OF THE INVENTION

A limited-slip brake control system is disclosed in copending application Ser. No. 714,425, filed Aug. 13, 1976, entitled "LIMITED-SLIP BRAKE CONTROL SYSTEM," by Robert L. Amberg and Narinder S. Attri, and assigned to the assignee of the present invention (now U.S. Pat. No. 4,078,845, issued Mar. 14, 1978). This brake control system functions to limit the brake force developed by the tires of a vehicle to the nonslip portion of a tire brake force and wheel velocity characterisitic curve, i.e., the front or positive slope side of the characteristic Mu/slip curve for the vehicle, to thereby minimize both tire and brake wear. The system includes three aspects: a basic deceleration control circuit; a large deviation control circuit; and an energy balance system.

The basic deceleration control circuit produces a wheel deceleration signal by filtering and differentiating a signal representing measured wheel speed. The wheel deceleration signal is then compared with a selected reference deceleration signal representing a reference or desired deceleration and a first deceleration error signal is generated which is applied to a hysteresis circuit which outputs a constant level, positive or negative signal. The output signal from the hysteresis circuit is integrated and supplied to a valve drive which in turn controls a brake valve to modulate the metered brake pressure applied to the wheel to be braked. The reference deceleration represented by the selected reference deceleration signal is chosen so that brake force developed as a result of the application of brake pressure is limited to the positive slope or nonslip portion of a characteristic Mu/slip curve for the vehicle, and the basic deceleration control circuit functions to cycle brake pressure, and therefore brake force, about a value that will produce the desired deceleration.

A situation may be encountered, however, where the coefficient of friction between the braked wheel and the ground surface is abruptly lowered, e.g., where a patch of ice exists on a runway. If the reference deceleration has been set at a level corresponding to the brake force that can be developed for a ground surface having a higher coefficient of friction, e.g., a dry runway, then the basic deceleration control circuit will command a brake pressure that will seek to develop a higher braking force than can be obtained when the lower coefficient of friction surface condition is encountered, thus resulting in an actual brake force which lies on the negative slope or slip portion of the Mu/slip curve and which causes the braked wheel to skid. The large deviation control circuit accordingly provides a second deceleration error signal when the wheel deceleration exceeds the reference deceleration by a predetermined amount. This second deceleration error signal is supplied to a lag circuit which is controlled to obtain an output signal which, when supplied to the valve driver, results in brake pressure being removed from the braked wheel in an amount and for a time related to the amount and time that the wheel deceleration exceeds the reference deceleration. Typically, the output signal from the lag circuit in the large deviation control circuit, and the output signal from the hysteresis circuit in the basic deceleration control circuit, are summed at the input to the valve driver so that the large deviation control circuit may control brake pressure when a skid is encountered and so that the basic deceleration control circuit may control brake pressure at all other times.

In order that all brakes of a multiwheeled vehicle perform properly with even wear of the tires of the braked wheels, the energy balance system is used for supplying the same brake pressure to all brakes, such as by using a common brake valve. Alternatively, the brake energy being put into each wheel may be determined by measuring, for each wheel, the actual brake torque and wheel speed, by multiplying the measured brake torque and wheel speed, and by integrating the resultant product. The measured brake energies are then compared, and any difference between brake energies is integrated and used to reduce, through a valve driver for each wheel, the brake pressure applied to the wheels that are working more and to increase the brake pressure applied to the wheels that are working less.

The aforementioned basic deceleration control circuit, large deviation control circuit, and energy balance system are discussed in more detail in the aforementioned U.S. Pat. No. 4,078,845 which is expressly incorporated herein by reference.

The basic object of the present invention is to provide a limited-slip brake control system which incorporates certain improvements over that disclosed in U.S. Pat. No. 4,078,845.

As a first example, the basic deceleration control circuit and the large deviation control circuit disclosed in U.S. Pat. No. 4,078,845 each function to integrate a deceleration error signal obtained from a comparison of wheel deceleration with a reference deceleration. Since the output signals obtained from such integration in the large deviation control circuit and the basic deceleration circuit are summed before application to the valve driver, the integration functions provided in those circuits tend to oppose each other so that a resultant control signal applied to the valve driver does not precisely respond to desired changes in brake pressure commanded by either the large deviation control circuit or the basic deceleration control circuit.

It is therefore an object of the present invention to provide a simpler system than that disclosed in U.S. Pat. No. 4,078,845, which simpler system includes both a large deviation control circuit and a basic deceleration control circuit, and which system permits both of these circuits to more precisely control brake pressure than is possible with the limited-slip brake control system disclosed in U.S. Pat. No. 4,078,845.

As a second example, the limited-slip brake control system in U.S. Pat. No. 4,078,845 is not capable of satisfactorily compensating for a ground surface condition having a low coefficient of friction that is encountered immediately upon application of brake pressure. In particular, the limited-slip brake control system in U.S. Pat. No. 4,078,845 permits brake pressure to build up to the maximum value established by the basic deceleration control circuit upon initial application of brake pressure. If a low coefficient of friction ground surface condition is encountered upon this initial application of brake pressure, the basic deceleration control circuit forces the vehicle into an initial skid, as previously described, which skid is eventually compensated for by the large deviation control circuit. It is desirable in certain circumstances to minimize the effect of this initial skid, particularly in the case where the vehicle is an aircraft and the initial skid occurs immediately upon touchdown.

It is therefore another object of this invention to provide an improved limited-slip brake control system which very quickly reduces brake pressure upon the occurrence of an initial skid.

As a third example, the braked wheels of an aircraft are supported from the aircraft fuselage by a lightly-damped landing gear strut assembly. Application of brake pressure by the limited-slip brake control system in U.S. Pat. No. 4,078,845 results in fore-and-aft oscillation of the landing gear strut assembly as the aircraft touches down and proceeds down the runway. This fore-and-aft oscillation produces an apparent variation in the velocity of the braked wheel which is sensed by the limited-slip brake control system as an apparent variation in wheel deceleration. As a result, the limited-slip brake control system functions to erroneously vary brake pressure about the value otherwise commanded by the basic deceleration control circuit.

It is therefore a further object of this invention to provide an improved limited-slip brake control system which is relatively insensitive to apparent changes in wheel deceleration occasioned by landing gear strut assembly oscillation.

SUMMARY OF THE INVENTION

These objects, and others that will be realized from a consideration of the following portion of the specification, are achieved, briefly, by a limited-slip brake control system which controls the brake force to be developed by a braking means for a wheel of a vehicle. The limited-slip brake control system of the present invention includes a first means for comparing measured deceleration of the wheel with a selected reference deceleration representing a level of brake force generally lying in the nonslip portion of a characteristic Mu/slip curve for the vehicle, and operative to provide a fixed-level, first output signal generally having a first polarity representing a decrease in brake force when the measured wheel deceleration exceeds the selected reference deceleration and generally having a second polarity representing an increase in brake force when the selected reference deceleration exceeds the measured wheel deceleration. The first output signal switches between the first and second polarities only when the difference between the measured wheel deceleration and the selected wheel deceleration exceeds a predetermined amount representing an incremental deceleration less than the selected reference deceleration. A second means compares the measured wheel deceleration with a second reference deceleration representing a level of brake force generally lying in a slip portion of the characteristic Mu/slip curve and is operative to provide a second output signal when the measured wheel deceleration exceeds the second reference deceleration, the second output signal having the first polarity representing a decrease in brake force and having a level proportional to the amount by which the measured wheel deceleration exceeds the second reference deceleration.

A third means additively combines the first and second output signals to obtain a summed output signal. A fourth means integrates the summed output signal to obtain a brake control signal representing a desired level of brake force, the brake control signal increasing and decreasing at a rate depending upon the level of the summed output signal. The brake control signal is applied to a fifth means which controls brake force in inverse proportion to the level of the braking control signal.

In order to quickly correct for deep skids encountered during the application of brake pressure, a sixth means is provided for comparing the measured wheel deceleration with a third reference deceleration representing a level of brake force lying in the slip portion of the characteristic Mu/slip curve, the third reference deceleration being higher than the second reference deceleration, and operative to provide a second brake control signal when the measured wheel deceleration exceeds the third reference deceleration, the second brake control signal having the first polarity representing a decrease in brake force and having a level proportional to the amount by which the measured wheel deceleration exceeds the third reference deceleration. A gating means is provided for coupling to the fifth means that one of the brake control or second brake control signals whose level represents a greater reduction in brake force.

An initial skid circuit may be provided for minimizing the extent of an initial skid encountered upon the initial application of brake force, the initial skid circuit being coupled with the second means and operative to produce a fixed-level, third output signal having the first polarity representing a decrease in brake force, but only in response to the first time that the wheel deceleration exceeds the second reference deceleration, the third output signal having a duration substantially equal to the expected duration of the initial skid. The third means correspondingly provides an additive combination of the first, second, and third output signals to obtain the summed output signal.

Alternatively, the initial skid circuit may be coupled with the second means and operative to increase the level of the second output signal at the first time that the wheel deceleration exceeds the second reference deceleration and for a period of time thereafter substantially equal to the expected duration of the initial skid.

In order to compensate for undesirable low-frequency oscillation in the measured wheel deceleration which typically occurs when brake force is developed by a wheel supported from an aircraft by a lightly-damped landing gear strut assembly, a dynamic compensation circuit may be provided which is responsive to the measured wheel deceleration for providing a compensating brake control signal having the first polarity representing a decrease in braking pressure, a 90° or greater phase lead for a range of frequencies in the measured wheel deceleration surrounding the expected frequency of the undesirable low-frequency oscillation, and a lesser phase lead for all other frequencies in the measured wheel deceleration. Means are provided for additively combining the compensating brake control signal with the brake control signal to compensate the brake control signal for oscillation therein resulting from the undesired low-frequency oscillation in the measured wheel deceleration.

BRIEF DESCRIPTION OF THE DRAWINGS

The invention can perhaps best be understood by reference to the following portion of the specification, taken in conjunction with the accompanying drawings in which.

DETAILED DESCRIPTION OF A PREFERRED EMBODIMENT

Figure 1:
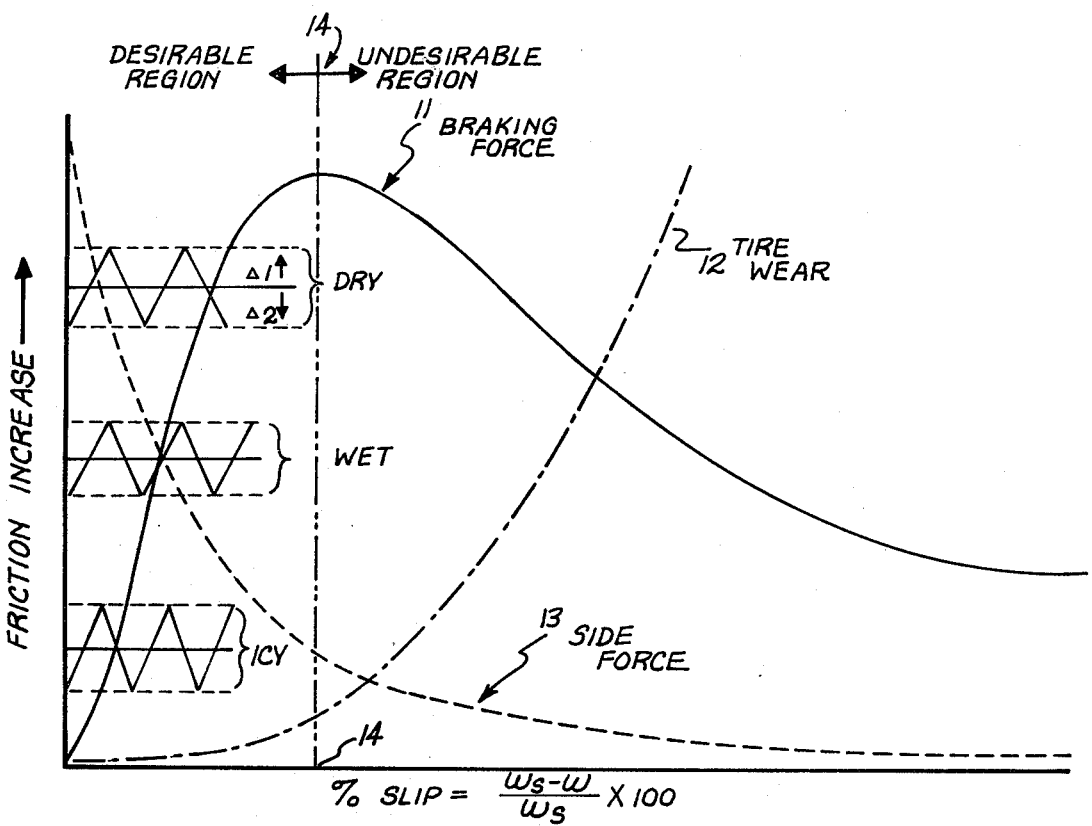
FIG. 1 is a characteristic tire coefficient of friction graph depicting by three curves the relationship of the braking force, the tire side force and the tire wear to the percentage of slip of the tire.

FIG. 1 is a graph showing the relationship between three curves: a brake force curve 11, in solid line; a tire wear curve 12, in dash-dot line; and a tire cornering or side force curve 13, in dashed line. These three curves are shown plotted on a characteristic graph of the coefficient of friction (Mu, or $\mu$) between a tire and the ground relative to the function of percent-slip, or as generally referred to as the Mu/slip curve. The maximum coefficients of friction are achieved (depending on many factors) when the apparent braked wheel speed is a value less than the free rolling speed. The decrease in braked wheel speed is the result of a rolling radius increase caused by the dynamic deformation of the tire, rather than by the slippage between the tire and the ground. This term "percent-slip" is not rigorously accurate. However, it is used because of the difficulty in measuring the relative velocity between the tire footprint and the ground; e.g., if the number of tire revolutions down the runway are multiplied by the deflected radius of the tire, this calculated distance will be somewhat less than the actual distance traveled down the runway. Therefore, a distinction is made between the calculated or measured slip and the actual slippage between the tire footprint and the ground. In the percent-slip equation, shown in FIG. 1, the rotational speed $\Omega_s$ is calculated for a given radius tire that will equal the actual distance traveled; and from this, the actual measured rotational speed $\Omega$ of the tire is subtracted, and this difference is then normalized or put into percent by dividing by the calculated rotational speed $\Omega_s$ and multiplying by 100. The zero percent-slip value, when the calculations are based on measurements from a wheel speed transducer, occurs at the point of zero braking, as shown in the graph of FIG. 1. There is in fact no actual slippage of the tire footprint relative to the bearing surface of the runway in the percent-slip range, under the positive slope or front-side portion of the brake force curve 11 or Mu/slip curve, or that portion thereof which is shown to the left of the vertical dash-dot-dot line 14. Actual tire slippage does not occur at the initial application of the brake force, but would begin somewhere around the peak of the Mu/slip curve, or near the vertical dash-dot-dot line 14, the basic premise being that for percent-slip below this level, there is no actual tire to ground slippage or tire footprint contact area slippage; however, above this level, the tire does begin to slide relative to the ground. Also, the frictional brake force or Mu is increased, up to a point where the tire starts to slide, and then it begins to decrease as the percent-slip is increased.

With respect to the tire cornering or side-force curve 13; the maximum tire side-force is obtained when there is no brake force being applied and there is zero percent tire slip. The tire side-force decreases fairly rapidly with the application of brake force. After the peak in the brake force curve is reached, or the tire starts slipping, the side-force curve 13 flattens out to a very low value.

With respect to the tire wear curve 12: initially, the tire wear remains at a fairly low value until the peak of the brake force curve 11 is reached and the tire starts slipping, then the tire wear increases very rapidly.

One of the objects of a limited-slip brake control system is to provide an essentially better compromise on these three aspects: tire wear, tire cornering or side-force capability, and brake force; by keeping the operation of the braking system on the front side of the brake force curve 11, so that a fair amount of side-force capability remains with very low tire wear.

The approach used to accomplish these objectives is to limit the rate of deceleration of the aircraft to such a level that the tires are operating on the front side of the brake force or Mu/slip curve 11, or to the left of the vertical dash-dot-dot line 14. This is in essence limiting the tire brake force to a level that can be generated without slippage between the ground and the tire.

In general, the well-known detailed apparatus of a braking system (not shown) would comprise: pilot operated brake pedals; metering valves; a control system; control valves; brake system hydraulics; and brakes. In the present system, the pilot would actuate a deceleration rate selector switch and apply pressure to the brake pedals, controlling the metering valves that supply pressure to the brakes through the control valves; and the control valves would then, through the present system, modulate the metered pressure to keep the operation of the tires on the front side of the Mu/slip curve.

In a further modified configuration of the present system, incorporating the fundamental braking apparatus, the actuation of the brake pedals would produce an electrical signal which would control the operational range of the system, rather than the metered brake pressure. The operational range would still be limited to the front side of the Mu/slip curve 11 as in the previously described configuration; however, no metering valves would be required. Differential braking for steering with brake forces would be achieved by making the appropriate pedals control the range of the wheels on respective sides of the airplane.

On the backside or negative slope side of the Mu/slip curve 11, or to the right of the vertical dash-dot-dot line 14, slippage between the tire footprint and the ground does occur. This slippage or skidding results in a rapid increase in tire wear rate as shown by the positive sloping line 12, and a deterioration in the tire's ability to react to a side load as shown by the negative sloping line 13. The generally known type of antiskid systems continually force the tire into operation on the backside of the Mu/slip curve 11, or to the right of the vertical line 14, in their continual functional determination to locate the peak of the Mu/slip curve 11.

Figure 2:
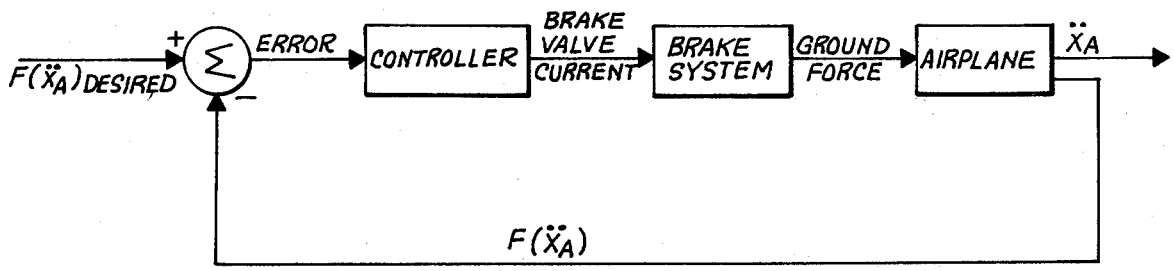
FIG. 2 is a functional block diagram of a limited-slip brake control system.

FIG. 2 is a simplified illustration in block diagram of a limited-slip brake control system wherein a function of airplane deceleration is measured and compared to a selected value of that function, which will maintain the tire brake force on the front side or positive sloping side of the Mu/slip curve shown in FIG. 1. In general, the system comprises a function of airplane deceleration, $F(\ddot{X}_A)$, which is measured and compared to a selected value of that function; and from a comparison of the function of airplane deceleration, with the desired value of that function, an error signal is generated and fed to the controller. The controller then produces a brake valve current in response to the information contained in the error signal, and this brake valve current then produces the brake force in the wheel brake system. The wheel brake system then produces the brake torque and ground force that results in the deceleration of the airplane and the function of airplane deceleration. A function of airplane deceleration is indicated since the actual deceleration of the airplane may not be the most convenient value to measure and use.

Another function that can be used in place of the function of airplane deceleration is the function of wheel deceleration. The wheel deceleration for a non-slipping tire is related to the deceleration of the airplane by the rolling radius of the tire; whereas, the wheel deceleration for a slipping tire is not related to the deceleration of the airplane. This discrepancy can often be used to the system's advantage. Wheel deceleration has the advantage that it can be easily derived from wheel speed information, and it also indicates horizontal deceleration. In contrast, direct airplane deceleration measurement produces a deceleration component referenced to the airplane, which therefore varies with airplane attitude.

Figure 3:
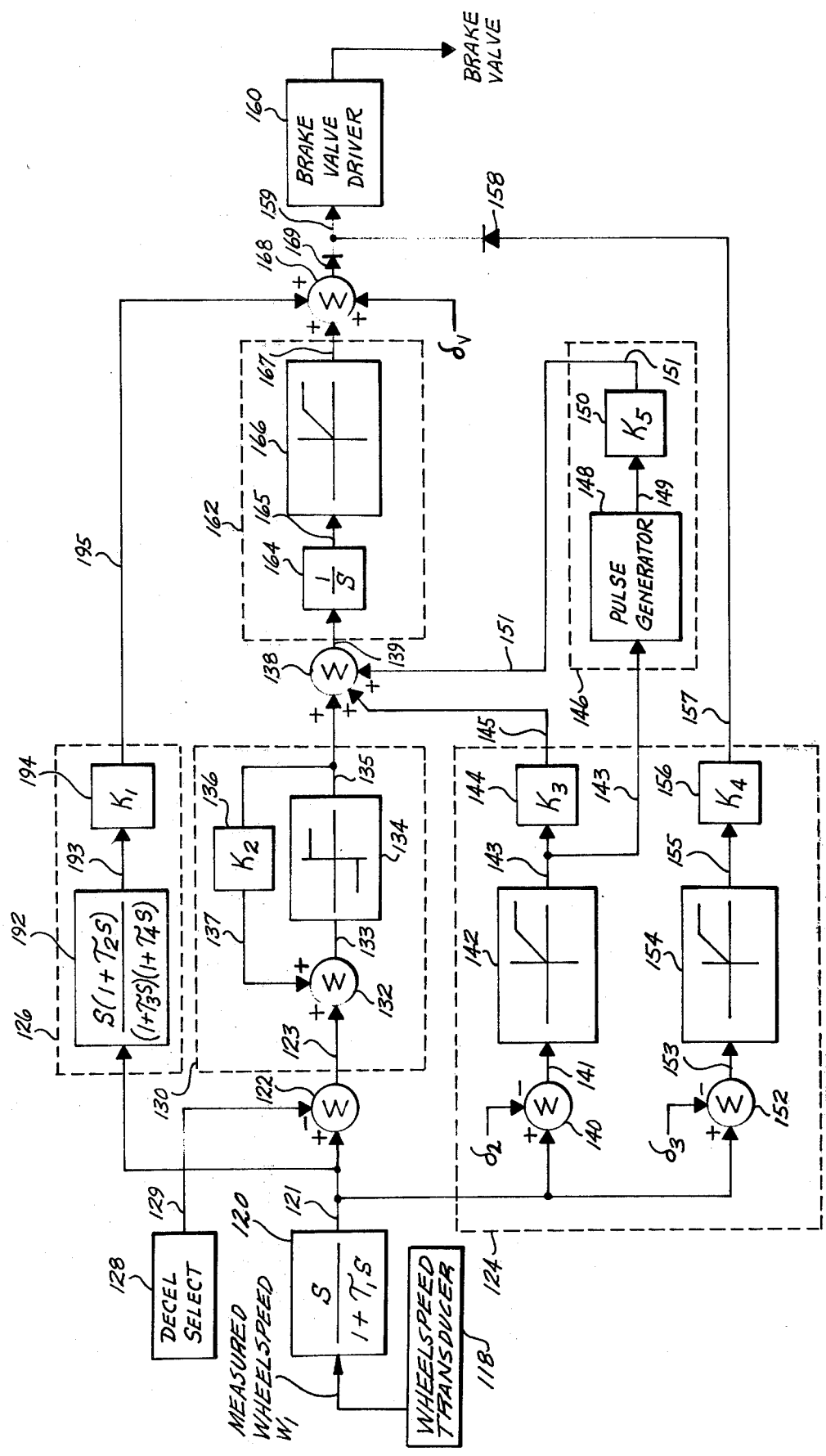
FIG. 3 is a functional block diagram of the improved limited-slip brake control system of the present invention including: a basic deceleration control circuit comprising a hysteresis circuit; a large deviation sensing circuit; an initial skid circuit; an integrating circuit responsive to output signals from the hysteresis circuit, the large deviation sensing circuit, and the initial skid circuit; and, a dynamic compensation circuit.

Now referring to FIG. 3, the improved limited-slip brake control system of the present invention includes a basic deceleration control circuit responsive to a wheel deceleration signal and a selected reference deceleration signal to provide a first brake control signal which is used to modulate brake pressure applied to the braked wheel in order to maintain the vehicle deceleration at the selected rate, and a large deviation control circuit which is also responsive to the wheel deceleration signal and which functions to reduce brake pressure in the situation where the braked wheel encounters a sudden decrease in the available coefficient of friction and is forced into a skid by the basic deceleration control circuit.

The basic deceleration control circuit includes: a summing junction 122 which compares a wheel deceleration signal on a line 121 from a differentiator 120 with a selected reference deceleration signal on a line 129 from a decel select circuit 128; a hysteresis circuit 130 which is responsive to a first deceleration error signal on a line 123 from summing junction 122; a summing junction 138 responsive to an output signal on a line 135 from hysteresis circuit 130; and, an integrating circuit 162 which is responsive to an output signal on a line 139 from summing junction 138, with the first brake control signal appearing on an output line 167 from integrating circuit 162. The large deviation control circuit includes: a large deviation sensing circuit 124 which is responsive to the wheel deceleration signal on line 121 from differentiator 120 to provide an output signal on a line 145 when wheel deceleration exceeds a second reference deceleration, preferably higher than the selected reference deceleration; the summing junction 138 which is also responsive to the output signal from large deviation sensing circuit 124 on line 145; and, the integrating circuit 162.

The first brake control signal on line 167 is applied to a summing junction 168. Neglecting for a moment the effect of the other signals supplied to summing junction 168 as illustrated in FIG. 3, the first brake control signal appears at the output of summing junction 168 and is coupled by a diode 169 and a line 159 to the input of a brake valve driver 160 which in turn provides a brake control signal to control the position of a brake valve (not illustrated) located in the hydraulic braking system. As previously described, a typical hydraulic braking system would provid metered brake pressure to the brakes of the braked wheel in response to pilot-applied pressure to the brake pedals of the brake system. The brake valve functions to modulate the metered brake pressure in inverse proportion to the first brake control signal applied to the brake valve drive 160. The first brake control signal includes a component, obtained from the basic deceleration control circuit, which will cause the brake pressure to increase when the actual wheel deceleration is lower than the selected reference deceleration, and to decrease when the actual wheel deceleration is greater than the selected reference deceleration. The first brake control signal will also include a component, obtained from the large deviation control circuit, which will cause the brake pressure to decrease as long as the actual wheel deceleration exceeds the second reference deceleration.

The basic deceleration control circuit and the large deviation control circuit illustrated in FIG. 3 therefore function in a manner similar to corresponding circuits in the limited-slip brake control system in U.S. Pat. No. 4,078,845. The limited slip brake control system of the present invention also provides a second brake control signal on a line 157 from large deviation sensing circuit 124 when the actual wheel deceleration exceeds a third reference deceleration, higher than the second reference deceleration (and therefore the selected reference deceleration), signifying that the braked wheel has gone into a deep skid, which second brake control signal is applied directly through a diode 158 and line 159 to brake valve drive 160 to immediately reduce brake pressure; an initial skid circuit 146 responsive to an output signal on a line 143 from large deviation sensing circuit 124, which output signal occurs when the actual wheel deceleration has exceeded the second reference deceleration, and with the initial skid circuit 146 functioning to provide an output signal on a line 151 to the summing junction 138 so as to modify the first brake control signal to minimize or eliminate the tendency of the basic deceleration control circuit to place the braked wheel into a skid upon the initial application of brake pressure; and, a dynamic compensation circuit 126 responsive to the wheel deceleration signal on line 121 and providing a compensating brake control signal on a line 195 to the summing junction 168 in order to compensate the brake pressure command represented by the first brake control signal applied to brake valve drive 160 for apparent changes in wheel deceleration occasioned by landing gear strut assembly oscillation.

Considering the improved limited-slip brake control system in more detail, a measured wheel speed signal $\omega_1$ is derived from an AC wheel speed transducer 118 which puts out a sine wave that is squared, and then filtered or rectified to produce a DC voltage that is proportional to wheel speed. The wheel speed signal $\omega_1$ is applied to a differentiator 120 whose transfer function is represented by the LaPlacian operator $(s/1+\tau_1 s)$, in which the operator s in the numerator represents a differentiation, and in which the operator $1+\tau_1 s$ in the denominator represents a lag circuit whose frequency is represented by the value of the contant $\tau_1$. Typically, $\tau_1$ is chosen so that the operator $1+\tau_1 s$ functions as a filter to attenuate higher frequencies, such as noise, radio frequency interference, and the like. The resultant output on line 121 from differentiator 120 is therefore proportional to differentiated wheel speed, or wheel deceleration.

The decel select circuit 128 provides a selected reference deceleration signal on line 129 which preferably comprises a DC signal representing a desired deceleration. The selected reference deceleration signal may be infinitely variable or may vary in discrete increments, in which case the decel select circuit 128 may include a selector switch having, for example, three positions corresponding to Dry, Wet and Icy runway conditions and accordingly representing high, intermediate and low decelerations.

The frictional characteristics of the tires of an airplane are such that each has a certain maximum available frictional force, depending on runway surface conditions. If all of the available ground friction force is used for braking operation, there is none left for the side frictional loads on the tires to control steering. The peak of the Mu/slip curve 11, or the maximum obtainable rate of deceleration under ideal dry runway surface conditions, would be approximately 12–13 ft/sec$^2$. However, in order to have a sufficient margin of frictional force in reserve for tire side loads, yaw correction, steering loads, and for passenger comfort, the positioning of the selector switch within decel select circuit 128 to the Dry position would preferably represent a desired deceleration of approximately 10 ft/sec$^2$; the Wet position would represent a desired deceleration of approximately 7–8 ft/sec$^2$; and the Icy position would represent a desired deceleration of approximately 5–6 ft/sec$^2$.

The wheel deceleration signal and selected reference deceleration signal are subtractively combined in summing junction 122, with the result that the first deceleration error signal on line 123 is proportional to the difference therebetween. The first deceleration error signal is positive if the wheel deceleration is greater than the reference deceleration and is negative if the wheel deceleration is lower than the reference deceleration. The first deceleration error signal is applied to a summing junction 132 where it is additively combined with a portion of the output of the hysteresis circuit 130 appearing on a line 137. An error signal appearing on the output of summing junction 132 is applied by a line 133 to the input of a limited amplifier 134. If the error signal on line 133 has a positive sign, then the limited amplifier 134 will provide, on its output line 135, a signal having a predetermined, positive value; and if the error signal on line 133 has a negative sign, then the signal on the output line 135 will have a predetermined, negative value. The signal on line 135 passes through the summing junction 138 and is applied by a line 139 to the input of the integrating circuit 162 and, more particularly, to an integrator 164 therein whose LaPlacian operator is represented as 1/s. The output of the integrator 164 is coupled by a line 165 to the input of a positive-value, limiting circuit 166 to whose output the line 167 upon which the first brake control signal previously described appears. As previously noted, the first brake control signal passes through the summing junction 168, the diode 169, and the line 159 to the brake valve driver 160.

The operation of the basic deceleration control circuit may be understood by considering the steps that take place when the system is installed on an aircraft and the aircraft touches down. At the time of touchdown, full brake pressure is applied to the braked wheels by the hydraulic braking system (not illustrated). As each braked wheel begins to turn upon frictional contact with the runway, the wheel speed will first increase, and then decrease due to the application of brake pressure. The rate of decrease of wheel speed, or wheel deceleration, is represented by the wheel deceleration signal on line 121. Previous to touchdown, a pilot will have selected the desired reference deceleration whereby a representative selected reference deceleration signal is being supplied on line 129. If the rate of wheel slowdown, or wheel deceleration, is lower than the reference deceleration, the first deceleration error signal on line 123 will have a negative sign and a magnitude proportional to the difference between the wheel deceleration and the reference deceleration. The negative first deceleration error signal will result in a negative, fixed-value output signal on line 135 from the limited amplifier 134. As a result, the output of the integrator 164 appearing on line 165 begins to decrease at a predetermined rate towards a negative value. The positive-value, limiting circuit 166 will only produce an output signal whose value is zero in response to an input signal whose sign is negative. Therefore, the first brake control signal on line 167 goes to and remains at a zero value.

The brake valves typically used to modulate the brake pressure in a hydraulic braking system have a deadband, in which the application to the valve of a brake control signal having a magnitude varying from zero to a first predetermined value results in no modulation of brake pressure. Above this first predetermined value, a further increase in the magnitude of the applied brake control signal results in an inversely proportional decrease in brake pressure. When the applied brake control signal reaches a second, predetermined value, the brake pressure is reduced to zero, i.e., the valve is completely closed.

In the summing junction 168, the first brake control signal, now at a zero value, is summed with a positive, fixed value signal $\delta_V$ which produces an offset in the brake control signal provided to the brake valve by the brake valve driver 160. This offset is equal to the first predetermined value representing the brake valve deadband, as a result of which the brake valve normally tests, when the first brake control signal has a zero value, at the start of its inversely proportional operating range. At this time, the brake valve driver 160 therefore provides a small positive brake control signal to the brake valve so that brake pressure is not reduced.

Due to the application of full brake pressure, the aircraft, and therefore the braked wheels, continues to decelerate. When the wheel deceleration exceeds the reference deceleration, the first deceleration error signal on line 123 becomes positive so that the output signal from limited amplifier 134 on line 135 switches to a positive, fixed value. As a result, the output signal from integrator 164 on line 165 eventually begins to rise to a positive value at a rate determined by the magnitude of the positive, fixed value output from limited amplifier 134. This positive-going output from integrator 164 is coupled through positive-value, limiting circuit 166 to appear as the first brake control signal on line 167 which accordingly causes brake valve driver 160 to provide an increasing, positive brake control signal to the brake valve to reduce brake pressure. The rate of brake pressure reduction is determined by the rate of increase of the first brake control signal, and thus by the magnitude of the positive, fixed value output from limited amplifier 134.

In the hysteresis circuit 130, the output signal appearing on line 135 is applied to the input of a gain circuit 136 (having a gain constant $K_2$), and the output signal from gain circuit 136 on a line 137 is coupled to and additively combined in summing junction 132 with the first deceleration error signal present on line 123. The gain constant $K_2$ is chosen so that the magnitude of the output signal on line 137 represents a certain incremental deceleration, e.g., 1 ft/sec$^2$. As the wheel deceleration begins to decrease in response to the decrease in brake pressure, the wheel deceleration signal on line 121 decreases. At some point, the wheel deceleration decreases to a point where it is equal to and then lower than the reference deceleration. At this point, the first deceleration error signal on line 123 goes negative. Due to the positive output signal from gain circuit 136 present on line 137, the output signal on line 133 from summing junction 132 does not go negative until the wheel deceleration has decreased below the reference deceleration by the incremental deceleration, e.g., 1 ft/sec$^2$. Limited amplifier 134 then switches to its negative, fixed value output, with the result that integrator 164 begins to ramp down to provide a corresponding ramp decrease in the first brake control signal, and to therefore again increase the brake pressure applied to the braked wheel at a rate determined by the magnitude of the negative, fixed value output from limited amplifier 134.

As brake pressure increases, wheel deceleration again increases. When wheel deceleration equals and exceeds the reference deceleration, the first deceleration error signal on line 123 goes positive. At this time, gain circuit 136 is supplying to the summing junction 132 a negative output signal representing the incremental deceleration, e.g., 1 ft/sec$^2$. Therefore, the output signal on line 133 does not go positive until the wheel deceleration equals and then exceeds the incremental deceleration.

It will therefore be appreciated that the basic deceleration control circuit allows the limited-slip brake control system to function as a deceleration rate searching system in which brake pressure, and therefore wheel deceleration, is constantly cycling between an amount $\Delta_1$ above the reference deceleration and an amount $\Delta_2$ below the reference deceleration, and at a rate determined by the fixed value outputs of the limited amplifier 134, as illustrated in the graphs superimposed on FIG. 1 for Dry, Wet and Icy settings of the decel select circuit 128.

Where a sudden change in the coefficient of friction of the runway is encountered, or when the pilot has selected too high a reference deceleration for the runway condition, the basic deceleration control circuit cannot maintain control of the braked wheel and will force the braked wheel into a skid. To permit the braked wheel to recover quickly from the skid, the large deviation control circuit is provided for modifying the first brake control signal to reduce brake pressure for the duration of and in response to each skid.

Specifically, the large deviation sensing circuit 124 includes a summing junction 140 which receives the wheel deceleration signal on line 121 from differentiator 120. A second reference deceleration signal $\delta_2$ is supplied to and subtractively combined in summing junction 140 with the wheel deceleration signal. Preferably, the second reference deceleration signal is set to represent a second reference deceleration higher than the reference deceleration represented by the selected reference deceleration signal from decel select circuit 128 and therefore would typically be in the range of 5–20 ft/sec$^2$. The second deceleration reference signal may be obtained from the selected reference deceleration signal, in which case the second reference deceleration would be a predetermined increment above the selected reference deceleration, or may be independently set. The output from summing junction 140 comprises a second deceleration error signal which is coupled by a line 141 to the input of a positive-value, limiting circuit 142 whose output on a line 143 is coupled through a gain circuit 144 and a line 145 to a second input of the summing junction 138. The positive-value, limiting circuit 142 has a transfer function similar to that of positive-value, limiting circuit 166. That is, the positive-value, limiting circuit 142 provides no output for negative values of the second deceleration error signal and provides a positive output signal proportional to positive values of the second deceleration error signal up to a predetermined value, after which the output signal of the circuit 142 is limited at that predetermined value.

When a skid occurs, i.e., when wheel deceleration exceeds the second reference deceleration represented by signal $\delta_2$, the second deceleration error signal on line 141 is coupled through circuit 142 to the input of gain circuit 144, and thence to the summing junction 138. The resultant output signal on line 139 causes the integrator 164 to ramp the first brake control signal up from the value established by the basic deceleration control circuit at a rate determined by the magnitude of the second deceleration error signal and the gain constant ($K_3$) of gain circuit 144. Accordingly, the signal supplied to the brake valve from brake valve driver 160 begins to increase to lower brake pressure. As brake pressure decreases, wheel deceleration decreases until a point where the wheel deceleration signal on line 121 equals and then goes below the signal $\delta_2$, at which time the output signal on line 145 from the large deviation sensing circuit 124 is terminated (due to the operation of positive-value, limiting circuit 142). Deceleration control then reverts to the basic deceleration control circuit which causes the integrator 164 to ramp the first brake control signal back down to increase brake pressure and thus wheel deceleration to the selected reference deceleration represented by the signal on line 129. Of course, if the ground surface conditions do not permit that selected reference deceleration to be maintained, the large deviation control circuit will again be operative to reduce brake pressure.

Where very deep skids are encountered, that is, those skids in which very high wheel decelerations occur, the portion of the large deviation control circuit previously described may not function to relieve the skid, inasmuch as the integrating circuit 162 requires a certain amount of time to reduce brake pressure. Accordingly, the large deviation sensing circuit 124 includes a summing junction 152 which is provided with the wheel deceleration signal on line 121 from differentiator 120. A third reference deceleration signal $\delta_3$ is subtractively combined in summing junction 152 with the wheel deceleration signal. Preferably, the third reference deceleration signal $\delta_3$ represents a third or high reference deceleration, e.g., 50 ft/sec$^2$, denoting a deep skid condition. The output of summing junction 152 comprises a third deceleration error signal which is coupled by a line 153 to the input of a positive-value, limiting circuit 154 whose output on a line 155 is applied to the input of a gain circuit 156. A second brake control signal appears on the output of gain circuit 156 and is coupled by a line 157 and diode 158 to the input line 159 of valve driver 160. Positive-value, limiting circuit 154 is similar to positive-value, limiting circuits 142 and 166. Accordingly, when wheel deceleration exceeds the third reference deceleration represented by the signal $\delta_3$, the third deceleration error signal on line 153 is coupled through circuit 154 to the input of gain circuit 156, as a result of which the second brake control signal, proportional to the third deceleration error signal, appears on line 157. Diodes 158 and 169 function as an exclusive OR-gate, that is, they couple to input line 159 only that one of the signals present on the output of summing junction 168 or the output line 157 which has a higher value. In the situation being discussed, the first brake control signal on line 167, as coupled through summing junction 168, will of necessity represent a commanded brake pressure that is higher than that obtainable with the existing ground surface condition. If the gain of circuit 156 (represented by the gain constant $K_4$) is correctly chosen, then diode 169 will be back biased and diode 158 will be forward biased so that only the second brake control signal on line 157 will be coupled to brake valve driver 160 to immediately reduce brake pressure to relieve the deep skid being encountered. As brake pressure is reduced, wheel deceleration will correspondingly decrease. As wheel deceleration decreases, the magnitude of the second brake control signal on line 157 will also decrease. A point will eventually be reached where diode 169 is forward biased and diode 158 is back biased, thereby returning control of brake pressure to the first brake control signal from integrating circuit 162.

It will be noted that the positive-value limits in positive-value, limiting circuits 166 and 154 are chosen to produce a signal from valve driver 160 corresponding to the zero pressure or closed position of the brake valve. The positive-value limit in the positive-value, limiting circuit 142, on the other hand, is chosen to determine the maximum rate at which brake pressure may be removed by the corresponding portion of the large deviation control circuit.

Upon touchdown of the aircraft on the runway, it will be remembered that full brake pressure is initially applied to the braked wheels, inasmuch as the basic deceleration control circuit takes a certain amount of time to reduce brake pressure to a level supportable by the existing runway conditions. As a result, a braked wheel is oftentimes forced into an initial skid which eventually will be corrected by the large deviation control circuit. It is desirable to minimize the extent of such an initial skid, particularly in the case of aircraft, and for this purpose, the initial skid circuit 146 is provided so that brake pressure may be more quickly reduced than is possible given the operation of the large deviation control circuit alone.

Specifically, the output signal on line 143 from the positive-value, limiting circuit 142 in the large deviation sensing circuit 124 is supplied to the input of a pulse generator 148 in the initial skid circuit 146. Pulse generator 148 is of a type, more completely disclosed with reference to FIG. 4, that provides a constant duration output signal on a line 149 in response to the first application of a signal to its input. The output signal on line 149 is coupled through a gain circuit 150 and a line 151 to a third input of the summing junction 138.

In operation, the first appearance of an output signal on line 143, which occurs when the wheel deceleration first exceeds the second reference deceleration established by the signal $\delta_2$, triggers pulse generator 148 to provide its constant duration output signal. The magnitude of this output signal is adjusted by the gain circuit 150 (having gain constant $K_5$) and is applied through summing junction 138 to the input of integrator 164, whereby the integrator 164 causes the first brake control signal on line 167 to increase at a greater rate than is commanded by the output signal on line 145 from the large deviation sensing circuit 124. Accordingly, brake pressure is more quickly reduced than would be the case if the large deviation control circuit alone were used, wih such an increased rate of pressure reduction being in effect for the duration of the output signal from pulse generator 148. Once the output signal from pulse generator 148 has been terminated, pulse generator 148 is inhibited from providing another output signal for a period of time sufficient to allow the vehicle to be braked to a complete stop. Therefore, the initial skid circuit 146 is operative to increase the rate of brake pressure reduction only in response to the first skid that is encountered, and to thereafter be disabled until the vehicle has come to a complete stop.

Figure 4:
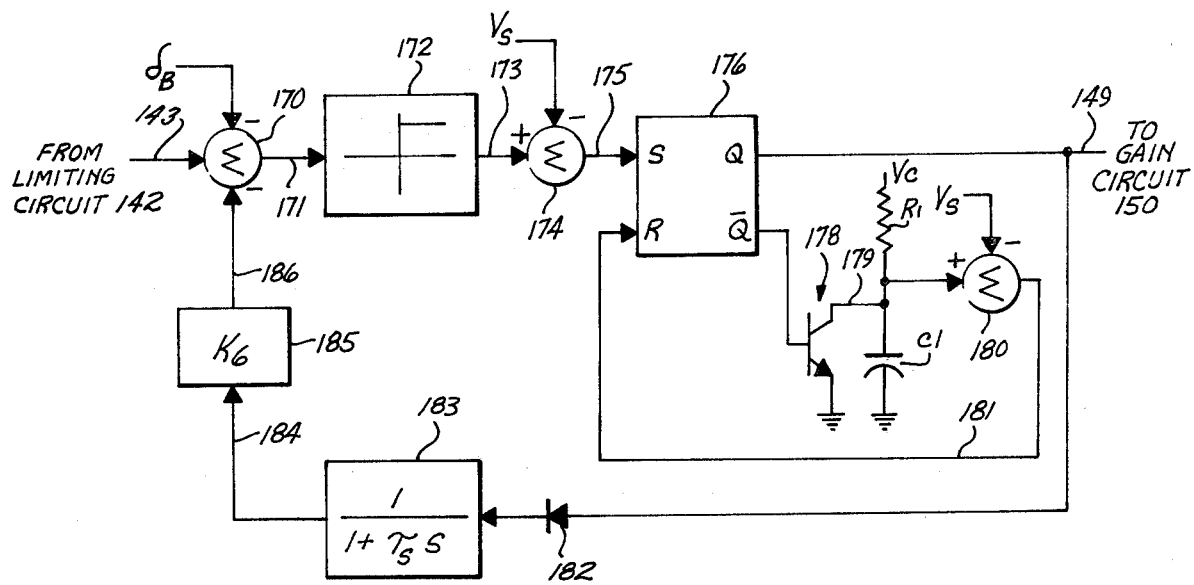
FIG. 4 is a combined schematic and block diagram of a preferred embodiment of a pulse generator forming part of the initial skid circuit.

With reference to FIG. 4, the output signal from positive-value, limiting circuit 142 on line 143 (which is the second deceleration error signal) is applied to a summing junction 170. A bias signal $\delta_B$ is subtractively combined with the signal on line 143 in summing junction 170 and the output thereof is coupled by a line 171 to the input of a positive-value circuit 172. For negative input signals, circuit 172 provides a zero output signal, and for positive input signals, circuit 172 provides a fixed, positive-value output. The output signal from circuit 172 is coupled by a line 173 to a summing junction 174 and subtractively combined therein with a fixed bias voltage $V_s$. The output from summing junction 174 is coupled by a line 175 to the set (S) input of an RS flip flop 176 whose Q output is connected to the output line 149 of the pulse generator 148 and therefore supplied to the gain circuit 150 (FIG. 3). The $\overline{Q}$ output of flip flop 176 is coupled to the base of a transistor 178 whose emitter is coupled to reference potential and whose collector is coupled by a line 179 to one input of a summing junction 180, to one side of a capacitor $C_1$, and to one side of a resistor $R_1$. The other sides of capacitor $C_1$ and resistor $R_1$ are respectively connected to reference potential and to a supply voltage $V_c$. The fixed bias voltage $V_s$ is also supplied to the summing junction 180 and subtractively combined therein with the signal on line 179. The output of the summing junction is coupled by a line 181 back to the reset (R) input of flip flop 176.

The output signal on line 149 of the pulse generator 148 is also fed back through a diode 182 to the input of a lag circuit 183 whose LaPlacian operator is represented as $1/1+\tau_5 s$). The output of lag circuit 183 is coupled by a line 184 to the input of a gain circuit 185 (having gain constant K$_6$), and the output of gain circuit 185 is coupled by a line 186 to the summing junction 170 and subtractively combined therein with the signal on line 143 from positive-value, limiting circuit 142.

In operation, the presence of a signal on line 143 signifies that the wheel deceleration has exceeded the second reference deceleration established by the signal $\delta_2$ and therefore signifies that the braked wheel is in a skid. The value of the bias signal $\delta_B$ is chosen to be some arbitrary, small amount so that summing junction 170 provides a positive output signal on line 171 only when the wheel deceleration has exceeded the second reference deceleration by a small amount. In response to the positive output signal on line 171, circuit 172 provides its fixed, positive-value output whose magnitude is chosen to be greater than that of the bias voltage $V_s$. As a result, summing junction 174 provides a positive output signal on line 175 to place flip flop 176 in its set state whereby a positive output signal is provided on line 149 and therefore supplied to gain circuit 150 to cause brake pressure to be reduced as previously described. When the output signal on the Q output of flip flop 176 goes positive, the output signal on the $\overline{Q}$ output of flip flop 176 goes negative, thereby turning off transistor 178 (which has been previously maintained in a conducting condition by a previous positive output signal occurring on the $\overline{Q}$ output). When transistor 178 turns off, a shunt provided thereby around the capacitor C$_1$ is removed and capacitor C$_1$ begins to charge to the supply voltage V$_c$ at a rate determined by the time constant of capacitor C$_1$ and resistor R$_1$. When the voltage across capacitor C$_1$ equals and then exceeds the bias voltage $V_s$, the output from summing junction 180 becomes positive and is applied through line 181 to the reset input of flip flop 176 to switch flip flop 176 to its reset state whereby the output signal on the Q output thereof is negative and the output signal on the $\overline{Q}$ output thereof is positive. At this time, the positive output signal on line 149 is removed. It will therefore be appreciated that the time constant associated with capacitor C$_1$ and resistor R$_1$ determines the length of the pulse from pulse generator 148, and therefore determines the time during which brake pressure is being reduced at an increasing rate by the initial skid circuit 146.

Only positive output signals on line 149 are coupled through diode 182 to the input of the lag circuit 183. Lag circuit 183 essentially functions as a delay circuit with a very long time constant, established by the value of the constant $\tau_5$, so that lag circuit 183 provides an output on line 184 for a very long period of time after the initial appearance of a positive output signal on line 149. Preferably, $\tau_5$ is chosen so that the output signal on line 184 persists for a period of time sufficient to allow the vehicle to come to a complete stop, e.g., two to three minutes. The gain constant K$_6$ in gain circuit 185 is chosen so that the output signal on line 186 from gain circuit 185 has a magnitude which is greater than any expected deceleration error during the time that brake pressure is being applied. Since the signal on line 186 is subtractively combined in summing junction 170 with the second deceleration error signal present on line 143, it will be seen that circuit 172 provides a zero output on line 173 until the vehicle has come to a full stop so as to inhibit flip flop 176 from again being set and to therefore inhibit the production of another positive output signal from pulse generator 148 until the vehicle has stopped.

Figure 5:
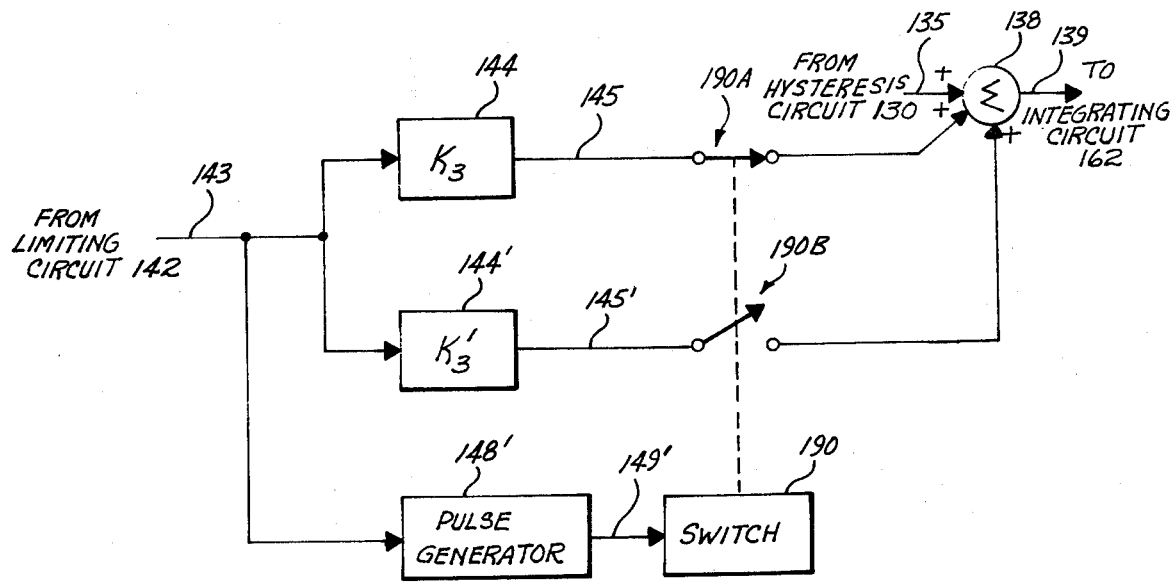
FIG. 5 is a functional block diagram of an alternate embodiment of the initial skid circuit.

The initial skid circuit 146 (FIG. 3) increases the rate of brake pressure reduction by a fixed amount as determined by the gain constant K$_5$ of gain circuit 150. It may desirable in certain circumstances to modulate this rate of brake pressure reduction in accordance with the magnitude of the initial skid, that is, in accordance with the magnitude of the deceleration error initially encountered. In such situations, the alternate embodiment illustrated in FIG. 5 may be used.

The second deceleration error signal on line 143 is applied, as in the embodiment of FIG. 3, to the gain circuit 144 (having gain constant K$_3$), with the output of gain circuit 144 being coupled by line 145 to the summing junction 138. The second deceleration error signal on line 143 is also coupled to the input of a second gain circuit 144' (having a gain constant K$_{3'}$) whose output is coupled by a line 145' to summing junction 138. A switch 190 is provided having normally closed contacts 190A interposed in line 145 and normally open contacts 190B interposed in line 145'. In situations where an initial skid is not encountered or where the initial skid has been compensated for, the gain circuit 144 is coupled to summing junction 138 by normally closed contacts 190A and therefore functions as part of the large deviation control circuit in the manner as previously described. The second deceleration error signal on line 143 is also applied to the input of a pulse generator 148' which functions identically to pulse generator 148. The output of pulse generator 148' is coupled by a line 149' to the input of switch 190. Accordingly, when an initial skid is encountered, pulse generator 148' provides an output signal on line 149' for a predetermined period of time which causes switch 190 to open contacts 190A and close contacts 190B. It will therefore be appreciated that, during the time of the output signal from pulse generator 148', brake pressure reduction will be controlled by the portion of the circuit in FIG. 5 including gain circuit 144' and that the rate of brake pressure reduction will be dependent not only upon the gain constant K$_{3'}$ but also upon the magnitude of the second deceleration error signal.

It will also be recognized that switch contacts 190A may be eliminated, in which case the rate of brake pressure reduction in response to an initial skid will be dependent on both of the gain contstants K$_3$ and K$_{3'}$.

When a limited-slip brake control system is used to modulate the brake in a hydraulic brake system for an aircraft in which the braked wheels are supported from the aircraft fuselage by a landing gear strut assembly, the initial application of brake pressure causes the landing gear strut assembly, which is lightly damped, to move in a direction opposite the direction of travel of the braked wheel along the runway. As a result of this movement, the braked wheel appears to slow down, resulting in a decrease in the measured wheel speed signal $\omega_1$. The decrease in the measured wheel speed signal $\omega_1$ provides a corresponding increase in the wheel deceleration signal on line 121 which will cause the limited-slip brake control system to reduce brake pressure. As brake pressure is reduced, the lightly damped landing gear strut assembly moves in the direction of travel of the braked wheel down the runway, producing an apparent increase in wheel speed which appears as a decrease in the wheel deceleration signal on line 121. The limited-slip brake control system will therefore cause brake pressure to increase so that the landing gear strut assembly again moves in a direction opposite the direction of aircraft travel. The landing gear strut assembly oscillation therefore causes brake pressure to constantly oscillate upwardly and downwardly in an undesirable manner. One solution to this problem would be to introduce lag into the differentiator 120 so that the limited-slip brake control system is essentially nonresponsive to the frequency of landing gear strut oscillation. However, since this frequency (typically 10Hz) is very low, the inclusion of such a lag in the differentiator 120 would significantly reduce the responsiveness of the limited-slip brake control system to actual changes in aircraft deceleration.

Therefore, the wheel deceleration signal on line 121 is applied to the dynamic compensation circuit 126 and specifically to the input of a double lead-double lag circuit 192 therein whose transfer function is represented by the LaPlacian operator $$\frac{s(1 + \tau_2 s)}{(1 + \tau_3 s)(1 + \tau_4 s)}.$$

The output of circuit 192 is coupled by a line 193 to the input of a gain circuit 194 (having a gain constant $K_1$) and the output of gain circuit 194 comprises a compensating brake control signal which is coupled by line 195 to the summing junction 168. The constants $\tau_2$, $\tau_3$, and $\tau_4$ of circuit 192 are chosen so that the output signal on line 193 has approximately a 90° phase lead for a range of frequencies in the wheel deceleration signal from zero up to and through the expected landing gear strut assembly oscillation frequency, and lesser decreasing phase lead for increasingly higher frequencies in the wheel deceleration signal. As an example, for an expected landing gear strut oscillation frequency of approximately 10Hz (about 64 radians per second), values of the constants $\tau_2$, $\tau_3$ and $\tau_4$ of approximately 30 radians per second, 90 radians per second, and 280 radians per second, respectively, will produce the required 90° phase lead. As a result, the output signal on line 193 (and thus the compensating brake control signal on line 195) will be increasing and decreasing at the frequency of landing gear strut assembly oscillation represented in the wheel deceleration signal, but 90° ahead of such oscillation. Those skilled in the art will appreciate that the integrating circuit 162 will introduce a substantially 90° phase lag to the landing gear strut assembly oscillation present in the wheel deceleration signal, and that the first brake control signal on line 167 will accordingly be increasing and decreasing at the frequency of landing gear strut assembly oscillation but delayed therefrom by 90°. Accordingly, the summation afforded by the summing junction 168 effects cancellation of the changes in the first brake control signal occasioned by landing gear strut assembly oscillation, provided that the value of the gain constant $K_1$ of gain circuit 194 is properly chosen.

The improved limited-slip brake control system of the present invention operates by measuring the wheel speed of a single braked wheel and by providing a control signal to control the brake pressure applied to the brakes for that wheel. In the case where the vehicle has a plurality of braked wheels, it will be necessary to provide a plurality of systems as illustrated in FIG. 3, one for each braked wheel, and to provide some means for energy balance between the braked wheels, such as the passive and active methods of energy balance disclosed in more detail in copending U.S. Pat. No. 4,078,845.

While the invention has been described with respect to a preferred embodiment, it will be clearly understood by those skilled in the art that the invention is not limited thereto, but that the scope of the invention is to be interpreted only in conjunction with the appended claims.

The embodiments of the invention in which an exclusive property or privilege is claimed are as follows:

1. A limited-slip brake control system for controlling the brake force to be developed by a braking means for a wheel of a vehicle, said limited-slip brake control system comprising:

first means for comparing measured deceleration of the wheel with a selected reference deceleration representing a level of brake force generally lying in a nonslip portion of a characteristic Mu/slip curve for the vehicle, and operative to provide a fixed-level, first output signal generally having a first polarity representing a decrease in brake force when said measured wheel deceleration exceeds said selected reference deceleration and generally having a second polarity representing an increase in brake force when said selected reference deceleration exceeds said measured wheel deceleration, said first output signal switching between said first and said second polarities only when the difference between said measured wheel deceleration and said selected reference deceleration exceed a predetermined amount representing an incremental deceleration less than said selected reference deceleration;

second means for comparing said measured wheel deceleration with a second reference deceleration representing a level of brake force generally lying in a slip portion of said characteristic Mu/slip curve and operative to provide a second output signal when said measured wheel deceleration exceeds said second reference deceleration, said second output signal having said first polarity representing a decrease in brake force and having a level proportional to the amount by which said measured wheel deceleration exceeds said second reference deceleration;

third means for additively combining said first and second output signals to obtain a summed output signal;

fourth means for integrating said summed output signal to obtain a brake control signal representing a desired level of brake force, said brake control signal increasing and decreasing at a rate dependent on the level of said summed output signal; and fifth means for controlling brake force in inverse proportion to the level of said brake control signal.

2. A limited-slip brake control system as recited in claim 1, further comprising: means for providing a wheel speed signal representing a measured rotational speed of the wheel; means differentiating said wheel speed signal to produce a wheel deceleration signal; and, wherein said first means further comprises: a deceleration select circuit for providing a selected reference deceleration signal representative of said selected reference deceleration; means for subtractively combining said wheel deceleration signal and said selected reference deceleration signal to produce a first deceleration error signal whose polarity and level are representative of the difference between said wheel speed deceleration signal and said selected reference deceleration signal; and, a hysteresis circuit responsive to said first deceleration error signal to produce said first output signal.

3. A limited-slip brake control system as recited in claim 1,
further comprising: means for providing a wheel speed signal representing a measured rotational speed of the wheel; means differentiating said wheel speed signal to produce a wheel deceleration signal; and,
wherein said second means comprises: a source of a second reference deceleration signal representative of said second reference deceleration; means for subtractively combining said wheel deceleration signal and said second reference deceleration signal to produce a second deceleration error signal whose polarity and level are representative of the difference between said wheel speed deceleration signal and said second reference deceleration signal; and, means for producing said second output signal in proportion to the level of said second deceleration error signal only when said wheel deceleration signal exceeds said second reference deceleration signal.

4. A limited-slip brake control system as recited in claim 3, wherein said means for producing said second output signal comprises: a limiting circuit having an input and an output, said second deceleration error signal being coupled to said input, said limiting circuit being operative to pass to its output only that polarity of said second deceleration error signal which is produced when said wheel deceleration signal exceeds its second reference deceleration signal; and, a gain circuit for producing said second output signal in proportion to the level of said second deceleration error signal passed by said limiting circuit.

5. A limited-slip brake control system as recited in claim 4, wherein said limiting circuit is further operative to limit the maximum level of said second deceleration error signal as passed by said limiting circuit to accordingly limit the maximum level of said second output signal, and, therefore, the maximum rate of brake force decrease represented by said second output signal.

6. A limited-slip brake control system as recited in claim 3, wherein said means for producing said second output signal is operative to limit the maximum level of said second output signal so as to establish a maximum rate of brake force decrease represented by said second output signal.

7. A limited-slip brake control system as recited in claim 1, further comprising:
sixth means for comparing said measured wheel deceleration with a third reference deceleration representing a level of brake force lying in the slip portion of said characteristic Mu/slip curve, said third reference deceleration being higher than said second reference deceleration, and operative to provide a second brake control signal when said measured wheel deceleration exceeds said third reference deceleration, said second brake control signal having said first polarity representing a decrease in brake force and having a level proportional to the amount by which said measured wheel deceleration exceeds said third reference deceleration; and,
gating means for coupling to said fifth means that one of said brake control or second brake control signals whose level represents a greater reduction in brake force.

8. A limited-slip brake control system as recited in claim 7,
further comprising: means for providing a wheel speed signal representing a measured rotational speed of the wheel; means differentiating said wheel speed signal to produce a wheel deceleration signal; and,
wherein said sixth means comprises: a source of a third reference deceleration signal representative of said third reference deceleration; means for subtractively combining said wheel deceleration signal and said third reference deceleration signal to produce a third deceleration error signal whose polarity and level are representative of the difference between said wheel deceleration signal and said third reference deceleration signal; and means for producing said second brake control signal in proportion to the level of said third deceleration error signal only when said wheel deceleration signal exceeds said third reference deceleration signal.

9. A limited-slip brake control system as recited in claim 8, wherein said means for producing said second brake control signal comprises a limiting circuit having an input and an output, said third deceleration error signal being coupled to said input, said limiting circuit being operative to pass to its output only that polarity of said third deceleration error signal which is produced when said wheel deceleration signal exceeds said third reference deceleration signal; and, a gain circuit for producing said brake control signal in proportion to the level of said third deceleration error signal as passed by said limiting circuit.

10. A limited-slip brake control system as recited in claim 9, wherein said limiting circuit is further operative to limit the maximum level of said third deceleration error signal as passed by said limiting circuit to accordingly limit the maximum level of said second brake control signal, and therefore, to establish a minimum brake force represented by said second brake control signal.

11. A limited-slip brake control system as recited in claim 1, further comprising an initial skid circuit for minimizing the extent of an initial skid encountered upon the initial application of brake force by the braking means, said initial skid circuit being coupled with said second means and operative to produce a fixed-level, third output signal having said first polarity representing a decrease in brake force only in response to the first time that said wheel deceleration exceeds said second reference deceleration, and having a duration substantially equal to the expected duration of said initial skid; and, wherein said third means additively combines said first, second and third output signals to obtain said summed output signal.

12. A limited-slip brake control system as recited in claim 11, wherein said initial skid circuit comprises: a pulse generator providing a constant-duration, pulse generator output signal only when said wheel deceleration initially exceeds said second reference deceleration; and, a gain circuit for adjusting the level of said pulse generator output signal to produce said third output signal.

13. A limited-slip brake control system as recited in claim 12, wherein said pulse generator comprises:

bistable switching means having first and second states and operative to produce said pulse generator output signal only when in said first state;

means coupled with said second means and operative to switch said bistable switching means to its first state when said wheel deceleration exceeds said second reference deceleration;

timing means responsive to said pulse generator output signal and operative to switch said bistable switching means to its second state at a predetermined time after said bistable switching means switches to its first state; and, a lag circuit responsive to said pulse generator output signal for inhibiting said bistable switching means from again being switched to its first state for a period of time greater than that expected for the vehicle to be braked to a complete stop.

14. A limited-slip brake control system as recited in claim 1, further comprising an initial skid circuit for minimizing the extent of an initial skid encountered upon the initial application of brake force by the braking means, said initial skid circuit being coupled with said second means and operative to increase the level of said second output signal at the first time that said wheel deceleration exceeds said second reference deceleration and for a period of time thereafter substantially equal to the expected duration of said initial skid.

15. A limited-slip brake control system as recited in claim 14, further comprising: means for producing a wheel speed signal representing a measured rotational speed of the wheel; means differentiating said wheel speed signal to produce a wheel deceleration signal; and wherein said second means comprises: a source of a second reference deceleration signal representative of said second reference deceleration; means for subtracting said second reference deceleration signal from said wheel deceleration signal to produce a second deceleration error signal whose level is proportional to the amount by which said measured wheel deceleration exceeds said second reference deceleration; an adjustable gain circuit coupled between said subtracting means and said third means for alternately providing respective first and second, proportionate increases in the level of said second deceleration error signal, said second proportionate increase being larger than said first proportionate increase, and said adjustable gain circuit normally providing said proportionate increase; and wherein said initial skid circuit is responsive to said second deceleration error signal and operative to control said adjustable gain circuit so that said adjustable gain circuit provides said second, proportionate increase for a predetermined period of time following the first occurrence of said second deceleration error signal.

16. A limited-slip brake control system as recited in claim 1, further comprising a dynamic compensation circuit for compensating for undesirable low-frequency oscillation occurring in said measured wheel deceleration, said dynamic compensation circuit being responsive to said measured wheel deceleration for providing a compensating brake control signal having said first polarity representing a decrease in braking force and having a 90° or greater phase lead for a range of frequencies in said measured wheel deceleration surrounding the expected frequency of said undesirable, low-frequency oscillation, and a lesser phase lead for all other frequencies in said measured wheel deceleration; and, means additively combining said compensating brake control signal with said brake control signal to compensate said brake control signal for oscillation therein resulting from said undesirable low-frequency oscillation.

17. A limited-slip brake control system as recited in claim 16, wherein said dynamic compensation circuit includes a double-lead double-lag circuit.

18. In a limited-slip brake control system controlling brake force to be developed by a braking means for a wheel of an aircraft, the wheel being supported by a lightly-damped landing gear strut assembly, the limited-slip brake control system being operative to compare measured deceleration of the wheel with a reference deceleration to obtain a deceleration error signal, and to integrate the deceleration error signal to obtain a brake control signal representing a desired level of brake force, an improvement for compensating the brake control signal for oscillation therein resulting from low-frequency oscillation in the measured wheel deceleration that is produced by the landing gear strut assembly when brake force is developed by the wheel, the improvement comprising a dynamic compensation circuit responsive to measured wheel deceleration for providing a compensating brake control signal having a 90° or greater phase lead for a range of frequencies in the measured wheel deceleration surrounding the expected frequency of oscillation produced by the landing gear strut assembly in the measured wheel deceleration, and a lesser phase lead for all other frequencies in the measured wheel deceleration; and, means for combining said compensating brake control signal with said brake control signal to compensate said brake control signal for said oscillation.

19. The improvement as recited in claim 18, wherein said dynamic compensation circuit includes a double-lead double-lag circuit.

20. A method for controlling the brake pressure applied to a brake means for a wheel of a vehicle, comprising the steps of:

causing said brake pressure to increase and decrease at a predetermined rate to produce a wheel deceleration substantially equal to a selected reference deceleration representing a level of brake force to be developed by the brake means which generally lies in a nonslip portion of a characteristic Mu/slip curve for the vehicle;

increasing the rate of brake pressure reduction above said predetermined rate as long as said wheel deceleration exceeds a second reference deceleration representing a level of brake force generally lying in a slip portion of said characteristic Mu/slip curve, said increase in the rate of brake pressure reduction being related to the amount by which said wheel deceleration exceeds said second reference deceleration; and causing brake pressure to be reduced in inverse proportion to the amount by which said wheel deceleration exceeds a third reference deceleration, said third reference deceleration being greater than said second reference deceleration, as long as said wheel deceleration exceeds said third reference deceleration.

21. A method as recited in claim 20 comprising the additional step of further increasing the rate of brake pressure reduction for a predetermined period of time subsequent to the first time that said wheel deceleration exceeds said second reference deceleration after the application of brake pressure to the braking means.

22. An apparatus forming part of a brake control system for an aircraft, the aircraft including a brake means for a wheel of the aircraft, means for applying brake pressure to the brake means, and a brake valve for reducing brake pressure in inverse proportion to the level of a brake control signal supplied thereto, said apparatus comprising:
  means providing a wheel deceleration signal related to the measured deceleration of the wheel;
  means responsive to said wheel deceleration signal for providing a first output signal generally having either a fixed positive level or a fixed negative level, respectively depending on whether said measured wheel deceleration is greater or lesser than a selected reference deceleration, said first output signal switching between said positive and negative levels only when the difference between said measured wheel deceleration and said selected reference deceleration exceeds a predetermined amount representing an incremental deceleration less than said selected reference deceleration;
  means responsive to said wheel deceleration signal for providing a second output signal as long as said measured wheel deceleration exceeds a second reference deceleration higher than said selected reference deceleration, said second output signal having a positive level determined by the amount that said measured wheel deceleration exceeds said second reference deceleration;
  means summing said first and said second output signals to provide a composite output signal;
  integrating circuit means for integrating only positive levels of said composite output signal to provide said brake control signal which increases and decreases at a rate determined by the level of said composite output signal; and
  means for applying said brake control signal to the brake valve.

23. An apparatus as recited in claim 22, further comprising: means responsive to said wheel deceleration signal for providing a second brake control signal as long as said measured wheel deceleration exceeds a third reference deceleration higher than said second reference deceleration, said second brake control signal having a positive level determined by the amount that said measured wheel deceleration exceeds said third reference deceleration; and, means for coupling said second brake control signal to the brake valve in place of said brake control signal whenever said second brake control signal has a level greater than that of said brake control signal.

24. An apparatus as recited in claim 22, further comprising initial skid means for providing a third output having a fixed, positive level and a fixed duration in response to the first occurrence of said second output signal, and wherein said first, second and third output signals are summed in said summing means to produce said composite output signal.

25. An apparatus as recited in claim 22, further comprising initial skid means for proportionately increasing the level of said second output signal for a fixed period of time subsequent to the first occurrence of said second output signal.

26. An apparatus as recited in claim 22, further comprising: a dynamic compensation circuit responsive to said wheel deceleration signal for providing a compensating brake control signal having a positive level, a 90° or greater phase lead for a range of frequencies in said wheel deceleration signal surrounding an expected frequency of oscillation in said wheel deceleration signal caused by oscillation of a landing gear strut assembly of the aircraft which supports the wheel and a lesser phase lead for all other frequencies; and, second summing means combining said brake control signal and said compensating brake control signal to produce a composite brake control signal for application to the brake valve.

* * * * *